United States Patent
Yeung et al.

(10) Patent No.: US 11,467,959 B1
(45) Date of Patent: Oct. 11, 2022

(54) CACHE ARBITRATION FOR ADDRESS TRANSLATION REQUESTS

(71) Applicant: Apple Inc., Cupertino, CA (US)

(72) Inventors: Winnie W. Yeung, San Jose, CA (US); Cheng Li, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/324,824

(22) Filed: May 19, 2021

(51) Int. Cl.
*G06F 12/0802* (2016.01)
*G06F 12/1027* (2016.01)

(52) U.S. Cl.
CPC ...... *G06F 12/0802* (2013.01); *G06F 12/1027* (2013.01); *G06F 2212/50* (2013.01); *G06F 2212/60* (2013.01); *G06F 2212/657* (2013.01)

(58) Field of Classification Search
CPC .. G06F 12/0802; G06F 12/10; G06F 12/1027; G06F 2212/50; G06F 2212/60; G06F 2212/657
See application file for complete search history.

(56) References Cited

U.S. PATENT DOCUMENTS

| | | | | |
|---|---|---|---|---|
| 2011/0107057 A1* | 5/2011 | Petolino, Jr. | ........ | G06F 12/1027 711/207 |
| 2012/0173843 A1* | 7/2012 | Kamdar | ............ | G06F 12/1027 711/207 |
| 2014/0258622 A1 | 9/2014 | Lacourba et al. | | |
| 2016/0048469 A1* | 2/2016 | Waugh | ............... | G06F 13/364 710/241 |
| 2016/0299853 A1* | 10/2016 | Kauer | ............... | H04L 45/74591 |
| 2017/0017589 A1 | 1/2017 | Feehrer et al. | | |
| 2017/0161184 A1* | 6/2017 | Colgrove | ............... | G06F 12/10 |
| 2018/0157601 A1* | 6/2018 | Bryant | ............... | G06F 12/12 |
| 2021/0026768 A1 | 1/2021 | Pierson et al. | | |

\* cited by examiner

*Primary Examiner* — Michael Krofcheck
(74) *Attorney, Agent, or Firm* — Kowert, Hood, Munyon, Rankin & Goetzel, P.C.; Michael B. Davis

(57) ABSTRACT

Techniques are disclosed relating to caching for address translation. In some embodiments, address translation circuitry is configured to process requests to translate addresses in a first address space to addresses in a second address space. The translation circuitry may include cache circuitry configured to store translation information, arbitration circuitry configured to arbitrate among ready requests for access to entries of the cache, and hazard circuitry. The hazard circuitry may assign a first request to an ready status the arbitration circuitry based on detection of an absence of hazards for a first address of the first request and add a second request to a queue of requests for the arbitration circuitry based on detection of a hazard for a second address of the second request. Independent arbitration for requests without hazards may improve performance in various aspects, relative to traditional techniques.

20 Claims, 8 Drawing Sheets

US 11,467,959 B1

CACHE ARBITRATION FOR ADDRESS TRANSLATION REQUESTS

BACKGROUND

Technical Field

This disclosure relates generally to address translation and more particularly to techniques for independently arbitrating translation requests in certain situations.

Description of the Related Art

Computer processors often use multiple memory spaces and may translate an address in one space to an address in another space. As one example, virtual memory is a common technique that abstracts storage resources that are actually available on a given system, which may provide an illusion of a large main memory. In this example, a processor may translate an address in a virtual memory space to an address in a physical memory space to access the requested data. In graphics processors, circuitry may implement one or more specialized graphics memory spaces, addresses of which may be translated to addresses in one or more other spaces (e.g., from a dedicated graphics space, to a virtual space, to physical space).

Address translations are often processed using one or more page tables. In hierarchical page table implementations, a translation may involve a page table walk. A translation lookaside buffer (TLB) is a type of cache that is often used to store information for previous translations in order to reduce the translation time of subsequent translations. TLBs are commonly used in paged and virtual memory implementations, but similar caches may be implemented for various types of address translations.

DETAILED DESCRIPTION

Figure 2A:
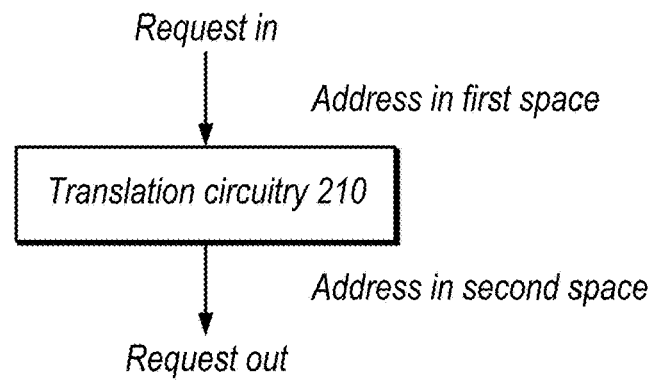
FIG. 2A is a block diagram illustrating translation circuitry, according to some embodiments.
Figure 2B:
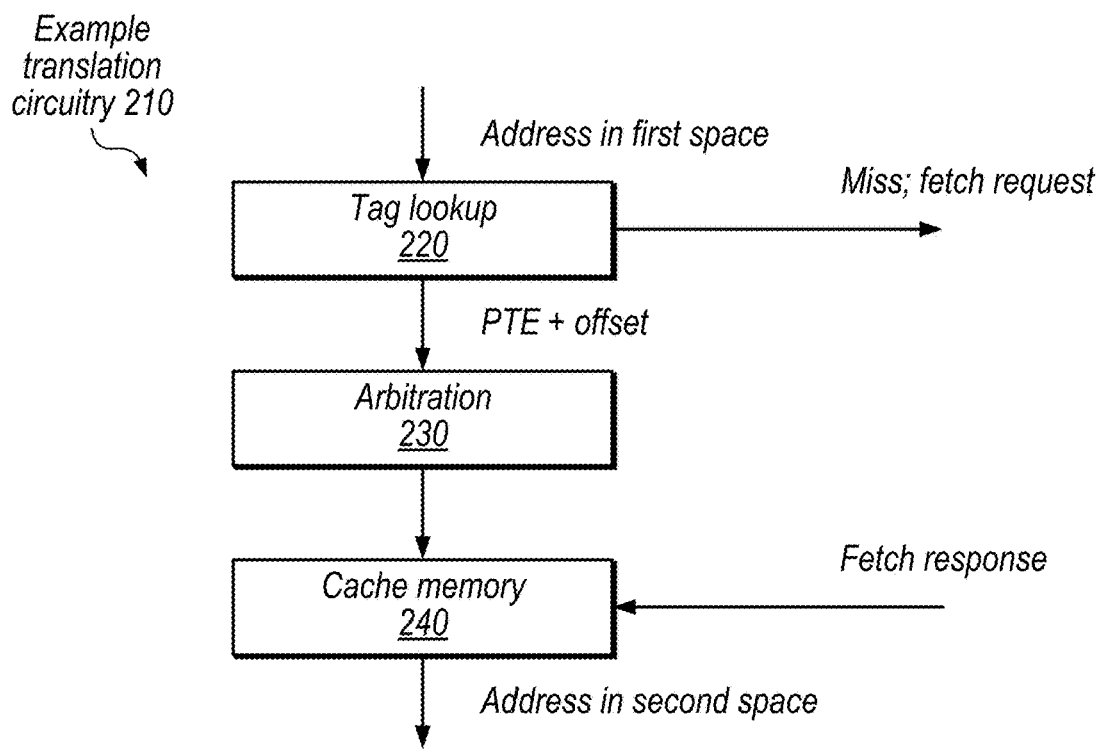
FIG. 2B is a block diagram illustrating arbitration circuitry included in translation circuitry, according to some embodiments.
Figure 2C:
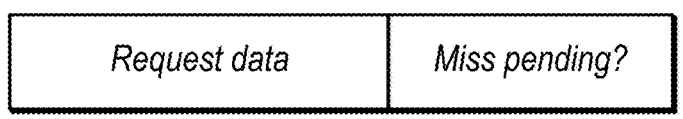
FIG. 2C is a diagram illustrating an example request tracking structure that includes a miss pending field, according to some embodiments.
Figure 3:
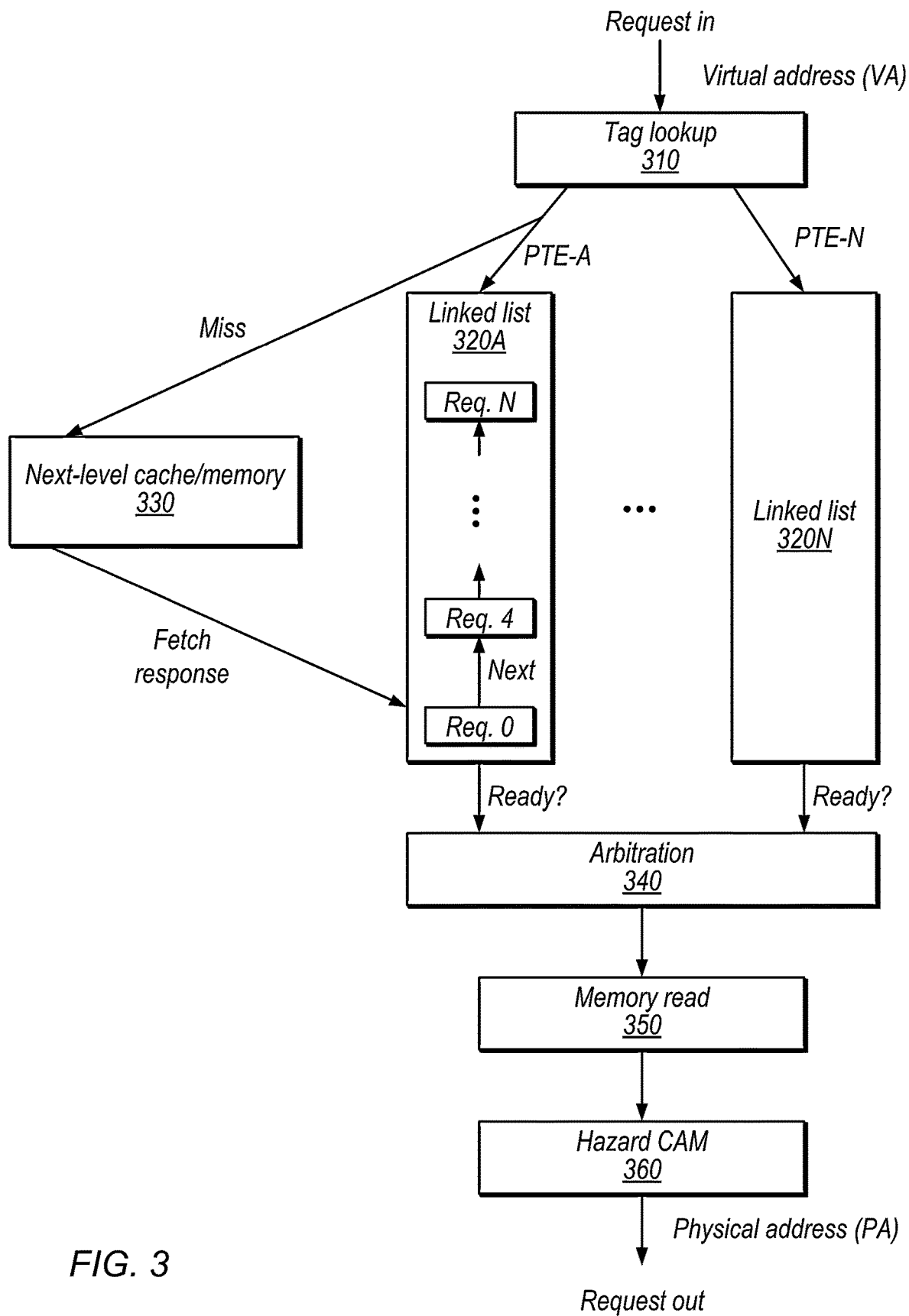
FIG. 3 is a block diagram illustrating a detailed example of translation circuitry, according to some embodiments.
Figure 4:
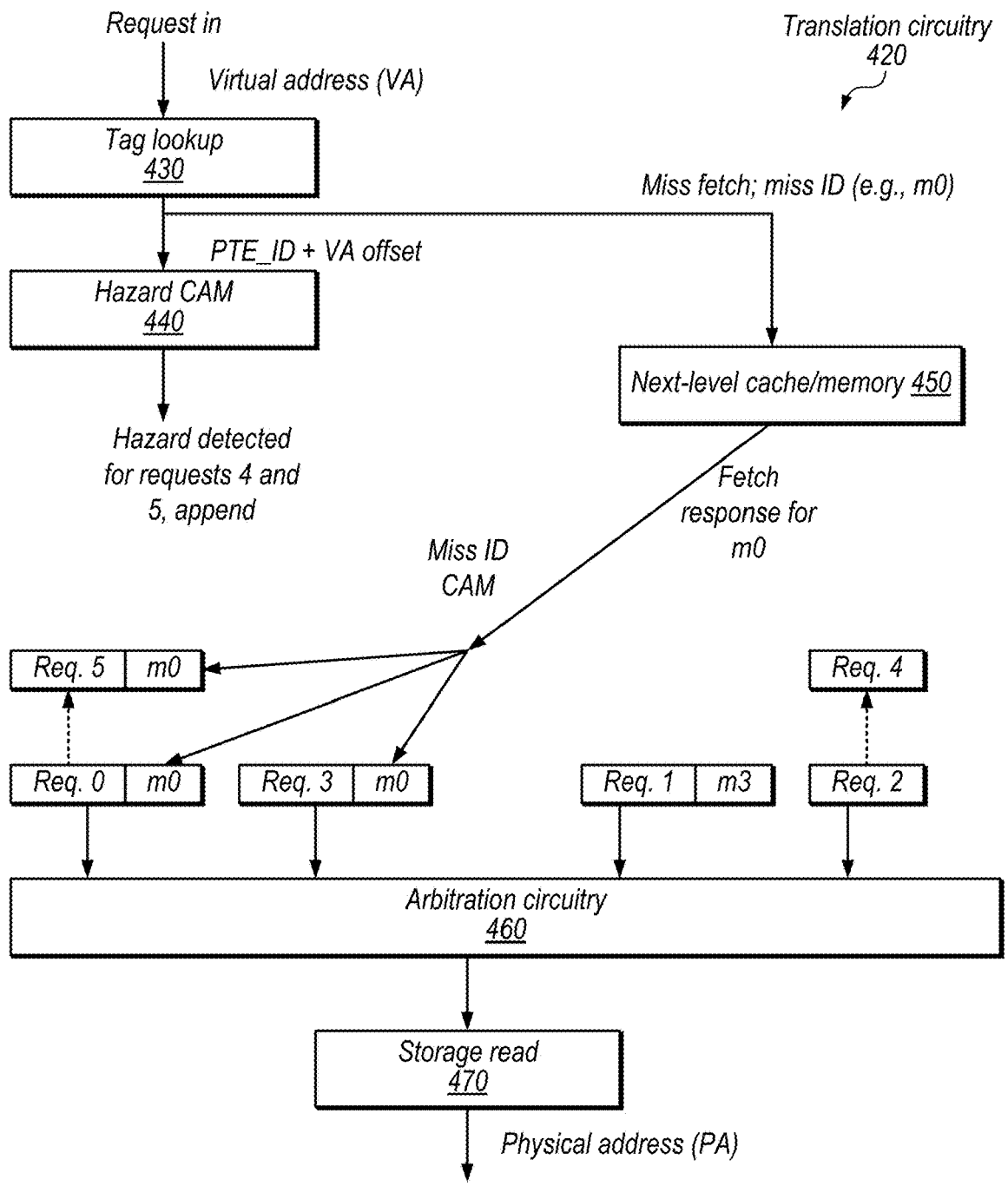
FIG. 4 is a block diagram illustrating a detailed example of translation circuitry that provides independent arbitration for certain requests to the same cache block, according to some embodiments.

In disclosed embodiments, arbitration techniques in address translation circuitry (e.g., in a TLB) allow requests to the same cache block to proceed independently in certain situations (e.g., where there are no hazards corresponding to other requests to the cache block). This may advantageously improve performance by reducing head-of-line blocking, provide more dynamic scheduling, and may allow prioritization of latency sensitive requests. FIGS. 2A-2C provide an overview of example translation circuitry. FIG. 3 provides an example of translation circuitry that does not allow independent arbitration for requests to the same cache block. FIG. 4 provides an example of translation circuitry that allows independent arbitration for requests to the same cache block in certain situations. The remaining figures provide an example method, device, system, and computer-readable medium.

Graphics Processing Overview

Figure 1A:
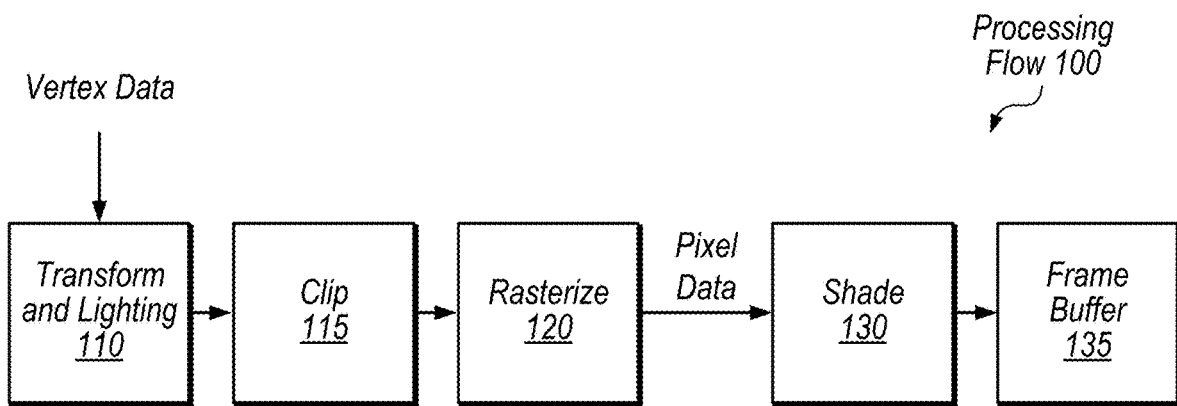
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
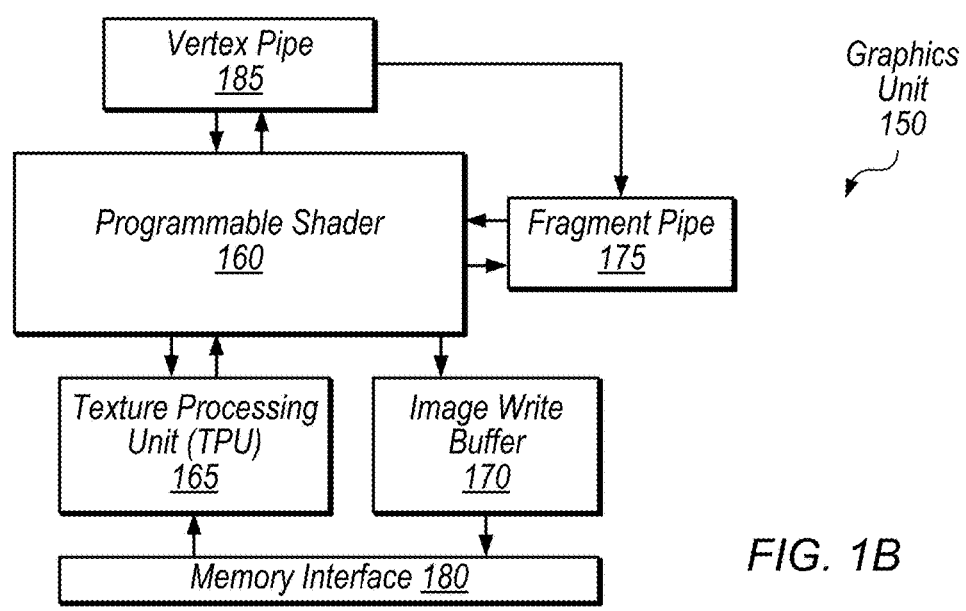
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Overview of Address Translation Circuitry

FIG. 2A is a block diagram illustrating example translation circuitry, according to some embodiments. In the illustrated example, translation circuitry 210 receives a request associated with an address in a first space and outputs a request with an address in a second space. For example, the request may be a memory access request (such as a load or store) with a virtual address and translation circuitry 210 may output a request with an address in a physical space. In some embodiments, translation circuitry 210 is included in a memory management unit (MMU) and may be a translation lookaside buffer (TLB).

Translation circuitry 210 may be configured to translate addresses across various memory spaces, including, without limitation: virtual, physical, sparse, graphics surface, private memory, register memory, etc. Translation circuitry 210 may be located at one or more of various locations in a memory hierarchy. For example, a processor may include multiple cache levels, one or more of which may be virtually tagged, virtually indexed, or both. In these examples, translation circuitry 210 may reside between a processor core and a cache or between two cache levels. In some embodiments, translation circuitry 210 implements a cache, which may be fully associative or set associative.

FIG. 2B is a block diagram illustrating an example of translation circuitry that includes arbitration circuitry, according to some embodiments. In the illustrated embodiment, translation circuitry 210 implements translation caching and includes tag lookup 220, arbitration circuitry 230, and cache memory 240.

Tag lookup circuitry 220, in the illustrated example, is configured to determine whether there is a cache hit based on the tag portion of an incoming address. If there is a miss, tag lookup 220 initiates a fetch request to a next level cache or memory to fetch a cache block. In the illustrated example, the cache blocks are page table entries (PTEs), but other types of cache blocks are contemplated.

Arbitration circuitry 230, in the illustrated example, receives information identifying a page table entry and an offset within the page table entry (which may be indicated by a portion of the address in the first space). In some embodiments, only requests that hit or have received a fetch response are eligible for arbitration. Arbitration circuitry 230 is configured to select from among multiple ready requests to access cache data in cache memory 240.

Cache memory 240, in the illustrated embodiment, stores cache blocks. Requests that win arbitration may access translation information (e.g., page table entries) stored in cache memory 240. Cache memory 240 may be a random access memory (RAM), for example. Based in the information in cache memory 240, translation circuitry 210 provides an output address in the second space. As discussed in detail below, requests to the same cache block may or may not have dependencies, e.g., due to hazards. The system may implement a weak or relaxed ordering model in which enforces data dependencies but otherwise allows reordering of memory accesses. Generally, it may be desirable for translation circuitry 210 to provide flexibility in arbitration while satisfying any dependencies among requests to the same cache block.

FIG. 2C is a diagram illustrating an example request structure that translation circuitry 210 may implement, according to some embodiments. This structure may be used internally by translation circuitry 210, e.g., for requests that are waiting for arbitration. In the illustrated example, the request includes request data (which may include the address in the first space) and a miss pending field that indicates whether a fetch is pending for the request. As discussed above, arbitration circuitry 230 may not consider requests with the miss pending field set for arbitration.

Example Translation Circuitry with Constrained Arbitration Scheduling

FIG. 3 is a block diagram illustrating example translation circuitry in which requests to the same cache block (e.g., page table entry) are non-independent during arbitration. In the illustrated example, the translation circuitry includes tag lookup 310, linked list control circuitry for linked lists 320A-320N next-level cache/memory 330, arbitration circuitry 340, memory read circuitry 350, and hazard CAM 360.

Tag lookup 310 may be configured similarly to tag lookup 220 described above and is configured to assign incoming requests to the tail of a linked-list for the page table entry (PTE) associated with the request. If there are no pending requests to that PTE, tag lookup 310 may assign the request as the head entry of a new list 320. For misses, tag lookup 310 sends a fetch request to next-level cache memory 330.

Next-level cache-memory 330 is a cache or a memory that provides fetch responses and indicates when fetch data for requests are available. For example, control circuitry may clear the miss pending field of corresponding requests in a linked list when a fetch response is received for a PTE.

Arbitration circuitry 340 may be configured similarly to arbitration circuitry 230 discussed above and arbitrates among the head entries of linked lists that are ready for arbitration (e.g., do not have misses pending). Memory read circuitry 350 accesses a memory element for requests that win arbitration to generate a physical address. Once a request wins arbitration, the next request in the list may become the head of the linked list and may be eligible for arbitration.

Hazard CAM 360, in the illustrated embodiment, is a content addressable memory structure (CAM) that checks requests for hazards (e.g., read after write hazards) based on addresses of requests that win arbitration. Note that these addresses may be in the physical address space, in the illustrated example. For example, output requests may go to different channels such as read and write channels and hazard CAM 360 may stall read requests until any prior write requests to the same address have provided a write response. The disclosed techniques of FIG. 3 may therefore arbitrate among requests to access the translation cache while avoiding hazards.

Relative to FIG. 3, embodiments discussed below with reference to FIG. 4 below may offer certain improvements or advantageous design tradeoffs. Generally, the design of FIG. 3 may limit the flexibility of scheduling, which may lead to bandwidth loss in an MMU and system-level performance drops. First, having a queue/linked-list per cache block of candidates may limit the pool of arbitration candidates and may lead to head-of-line blocking in certain situations, which may in turn lead to bandwidth reduction. For example, due to spatial locality and large page tables in GPU embodiments, there may be only a few queues (or even a single queue) with entries ready for arbitration under certain workloads, which may be blocked due to a hazard or bus backpressure. Second, latency sensitive requests may suffer long latency in certain situations. For example, in the case of a cache miss a long list may be formed waiting on the miss and a latency sensitive request at the end of the list may have to wait, even if it is not waiting for a cache fetch or any hazards. Third, the disclosed embodiment may require strict ordering post-scheduling and substantial area and power to handle hazard cases. Given that ordering may not be guaranteed between output channels (e.g., between write and read channels) or even within the same channel, substantial content-addressable-memory (CAM) structures may be needed as well as a buffer to hold requests with hazards. Fourth, the disclosed embodiment of FIG. 3 may require checking of page valid information for each request to generate re-fetch information in multi-line cache fetch implementations, which may reduce performance if cache blocks sharing a cache tag are not all valid.

Example Translation Circuitry with Potentially-Independent Arbitration Scheduling FIG. 4 is a block diagram illustrating example translation circuitry that provides independent arbitration for certain requests to the same cache block, according to some embodiments. In the illustrated example, a tracking structure 410 for requests includes a miss identifier that identifies the cache block (e.g., page table entry) associated with the request. Note that the miss identifier may be different than the tag of the cache block, e.g., in set associative caching implementations or may be the same as the tag of the cache block, e.g., in multi-line fetch implementations. As discussed in detail below, the miss identifier may allow control circuitry to update requests in multiple different queue structures (e.g., linked lists) on a fetch response, which may facilitate independent arbitration of requests to the same cache block.

In the illustrated embodiment, example translation circuitry 420 includes tag lookup 430, hazard CAM 440 arbitration circuitry 460, and storage read 470, and is configured to fetch data from a next-level cache or memory 450.

Tag lookup 430, in the illustrated embodiment, is configured to receive a request with a virtual address and determine whether there is a hit in the cache. In response to a miss, tag lookup 430 generates a fetch request and assigns a miss identifier to the request. In the illustrated example, the miss identifier for one of the cache blocks is "m0" and multiple requests (requests 0, 3, and 5) are assigned the same miss identifier. Other requests to other cache blocks have other miss identifiers, e.g., m3 for request 1. Other requests that do not miss (e.g., requests 2 and 4) are not assigned a miss identifier, but may be immediately eligible for arbitration once they reach the head of their list.

On a fetch response for miss identifier m0, in the illustrated example, control circuitry uses a CAM structure to find all requests with that miss identifier and clear their miss pending fields.

Hazard CAM 440, in the illustrated embodiment, is configured to operate on virtual address information (the page table identifier and virtual address offset for the request address in this example). More generally, hazard circuitry is configured to operate in the input address space rather than the output address space in some embodiments.

In this example, a hazard is detected for requests 4, and 5. In this case, the control circuitry appends the request for which a hazard was detected to the linked list in which the request on which it depends resides. For example, request 5 is appended to the list with request 0 and request 4 is appended to the list for request 2. When there is not a hazard, however, control circuitry is configured to create a new linked list for the request, where the request is the head of the list as has a ready status for the arbitration circuitry 460, e.g., as performed for request 3. In particular, while request 3 would have been assigned to the list with requests 0 and 5 in the implementation of FIG. 3 because they all access the same cache block, the circuitry of the embodiment of FIG. 4 is configured to assign request 3 for independent arbitration. Further, the miss identifier circuitry allows correct updates of the different lists on a fetch response. As used herein, the term "ready status" in the context of arbitration circuitry refers to an input to the arbitration circuitry that is a candidate to be selected in the current arbitration decision (e.g., has any dependencies resolved and whose data is available, for a write request). For example, when request 3 is processed it is assigned a ready status and is available for arbitration but when request 5 is processed it is assigned to the queue behind request 0 and does not have a ready status. Thus, circuitry may arbitrate request 3 independently of other requests to the same cache block, in this example.

Arbitration circuitry 460, in the illustrated embodiment, is configured to arbitrate among requests that are not waiting for a fetch. For example, if fetches for the m0 and m3 miss identifiers have completed, arbitration circuitry may arbitrate among requests 0, 1, 2, and 3 in the illustrated example. Arbitration circuitry 460 may utilize one or more of various appropriate arbitration algorithms to select among requests. For example, arbitration circuitry 460 may implement a round-robin or weighted round robin scheme among inputs. Arbitration circuitry 460 may implement one or more priority schemes during arbitration. As one example, requests may include a latency sensitivity field that indicates whether a request is latency sensitive and arbitration circuitry 460 may prioritize latency sensitive requests over other types of requests.

The circuitry of FIG. 4 may provide various advantages over traditional techniques and over the circuitry of FIG. 3. The CAM structure may allow miss pending status for multiple requests to be cleared at the same time. The hazard CAM operating on the virtual address and cache block identifier may allow unique identification of each address with a comparison of a smaller number of bits than for a physical comparison. Requests to the same cache block may be independently scheduled to different inputs of the arbitration circuitry, which may provide proper ordering while reducing head-of-line blocking. Further, latency sensitive requests may be prioritized, particularly when they can be independently arbitrated. Generally, the disclosed circuitry may provide more dynamic scheduling, which may be optimized for different system metrics and output channels for a highly extensible design. This may be particularly useful in larger graphics processors, which may incorporate distributed instances of various circuit blocks. Disclosed circuitry may also be used for translation in various other types of processors (e.g., central processing units), memory management units, etc.

As discussed above, while the detailed example of FIG. 4 translates between virtual addresses and physical addresses, the disclosed circuit techniques may be used for any of various types of address translations between different memory spaces.

Example Method

Figure 5:
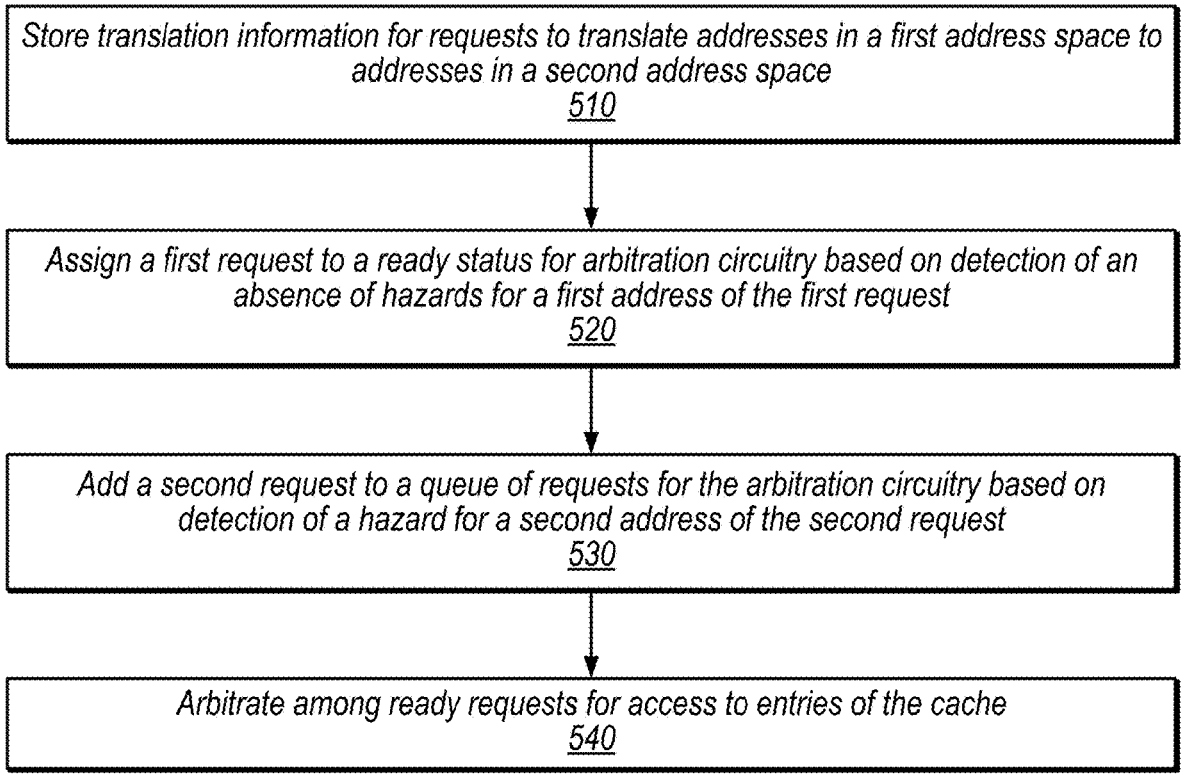
FIG. 5 is a flow diagram illustrating an example method, according to some embodiments.

FIG. 5 is a flow diagram illustrating an example method for arbitration translation requests, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, cache circuitry stores translation information for requests to translate addresses in a first address space to addresses in a second address space. In some embodiments, the cache circuitry is included in a translation lookaside buffer, the first address space is a virtual address space and the second address space is a physical address space.

At 520, in the illustrated embodiment, hazard circuitry assigns a first request to a ready status for the arbitration circuitry based on detection of an absence of hazards for a first address of the first request. This may include creating a new linked list for the request, with the request at the head of the queue. Request 3 of FIG. 4 is an example of the first request. In some embodiments, the hazard circuitry is configured to detect read after write hazards and enforce that a read to a given address waits for any write responses for the address.

At 530, in the illustrated embodiment, hazard circuitry adds a second request to a queue of requests for the arbitration circuitry based on detection of a hazard for a second address of the second request. Request 5 of FIG. 4 is an example of the second request. Note that the queue may not be a physical structure but may be a data structure such as a linked-list maintained by scoreboard circuitry.

At 540, in the illustrated embodiment, the arbitration circuitry arbitrates among ready requests for access to entries of the cache. In some embodiments, control circuitry (e.g., miss handling logic, which may not be included in the arbitration circuitry) is configured to, in response to determining that the first address does not hit in the cache circuitry, initiate a fetch for the first request, assign a miss identifier to the first request and indicate that the first request is not ready for arbitration. In some embodiments, the control circuitry is further configured to, based on a fetch response, indicate that a set of one or more requests is ready for arbitration, wherein the set of one or more requests were assigned the miss identifier. The miss identifier may be assigned to a block of the cache circuitry.

In some embodiments, the first request includes an indication of latency-sensitivity and the arbitration circuitry is configured to prioritize latency sensitive requests over one or more other types of request.

Example Device

Figure 6:
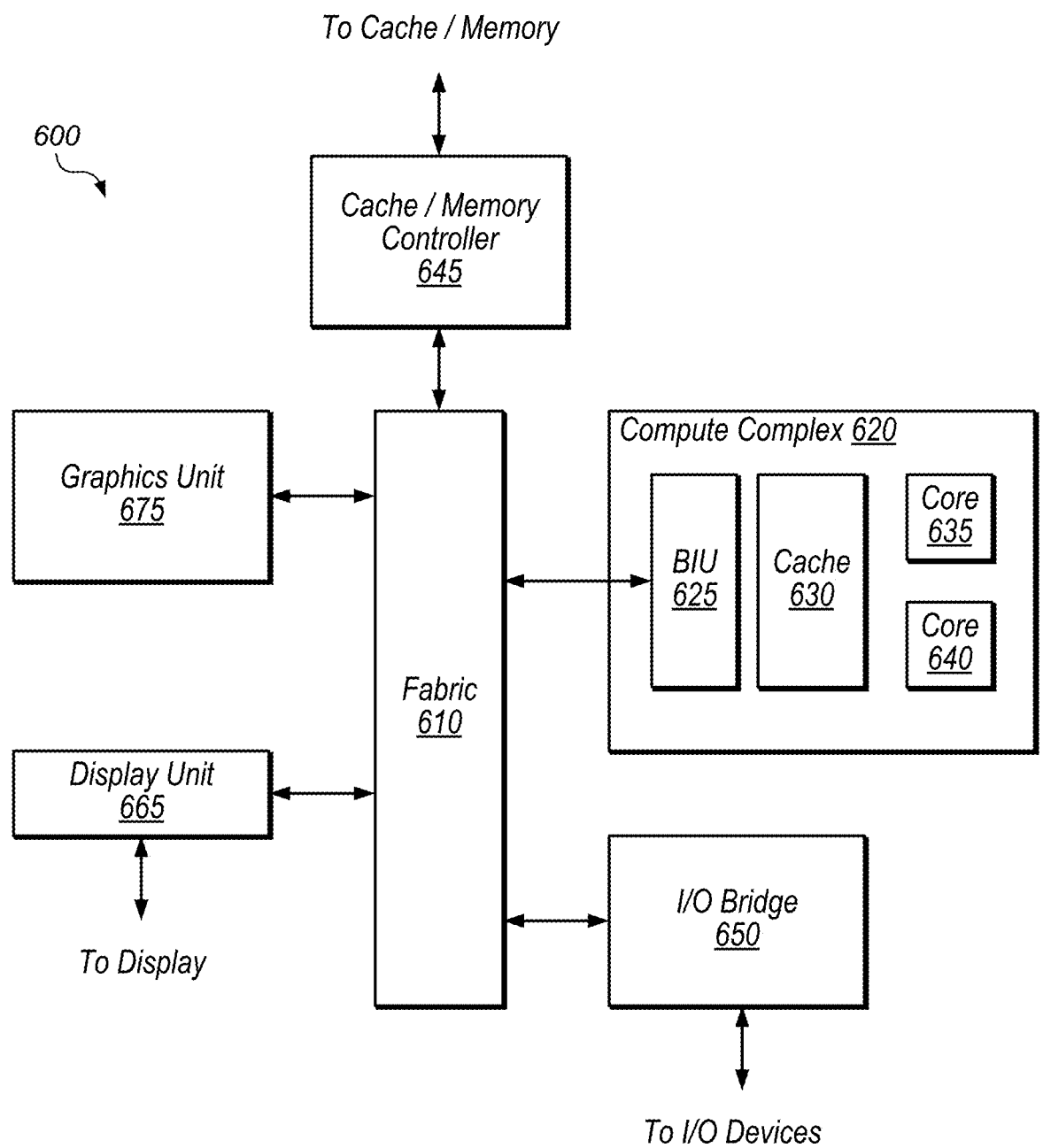
FIG. 6 is a block diagram illustrating an example computing device, according to some embodiments.

Referring now to FIG. 6, a block diagram illustrating an example embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 675, and display unit 665. In some embodiments, device 600 may include other components (not shown) in addition to or in place of the illustrated components, such as video processor encoders and decoders, image processing or recognition elements, computer vision elements, etc.

In some embodiments, disclosed translation circuitry may improve performance, reduce power consumption, or both for one or more elements of device 600, including, for example, graphics unit 675, cache/memory controller 645, compute complex 620, or any combination thereof.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and caches. For example, compute complex 620 may include 1, 2, or 4 processor cores, or any other suitable number. In one embodiment, cache 630 is a set associative L2 cache. In some embodiments, cores 635 and 640 may include internal instruction and data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 675 may be described as "coupled to" a memory through fabric 610 and cache/memory controller 645. In contrast, in the illustrated embodiment of FIG. 6, graphics unit 675 is "directly coupled" to fabric 610 because there are no intervening elements.

Graphics unit 675 may include one or more processors, e.g., one or more graphics processing units (GPU's). Graphics unit 675 may receive graphics-oriented instructions, such as OPENGL®, Metal, or DIRECT3D® instructions, for example. Graphics unit 675 may execute specialized GPU instructions or perform other operations based on the received graphics-oriented instructions. Graphics unit 675 may generally be configured to process large blocks of data in parallel and may build images in a frame buffer for output to a display, which may be included in the device or may be a separate device. Graphics unit 675 may include transform, lighting, triangle, and rendering engines in one or more graphics processing pipelines. Graphics unit 675 may output pixel information for display images. Graphics unit 675, in various embodiments, may include programmable shader circuitry which may include highly parallel execution cores configured to execute graphics programs, which may include pixel tasks, vertex tasks, and compute tasks (which may or may not be graphics-related).

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and low-power always-on functionality, for example. I/O bridge 650 may also include interfaces such as pulse-width modulation (PWM), general-purpose input/output (GPIO), serial peripheral interface (SPI), and inter-integrated circuit (I2C), for example. Various types of peripherals and devices may be coupled to device 600 via I/O bridge 650.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 600 with connectivity to various types of other devices and networks.

Example Applications

Figure 7:
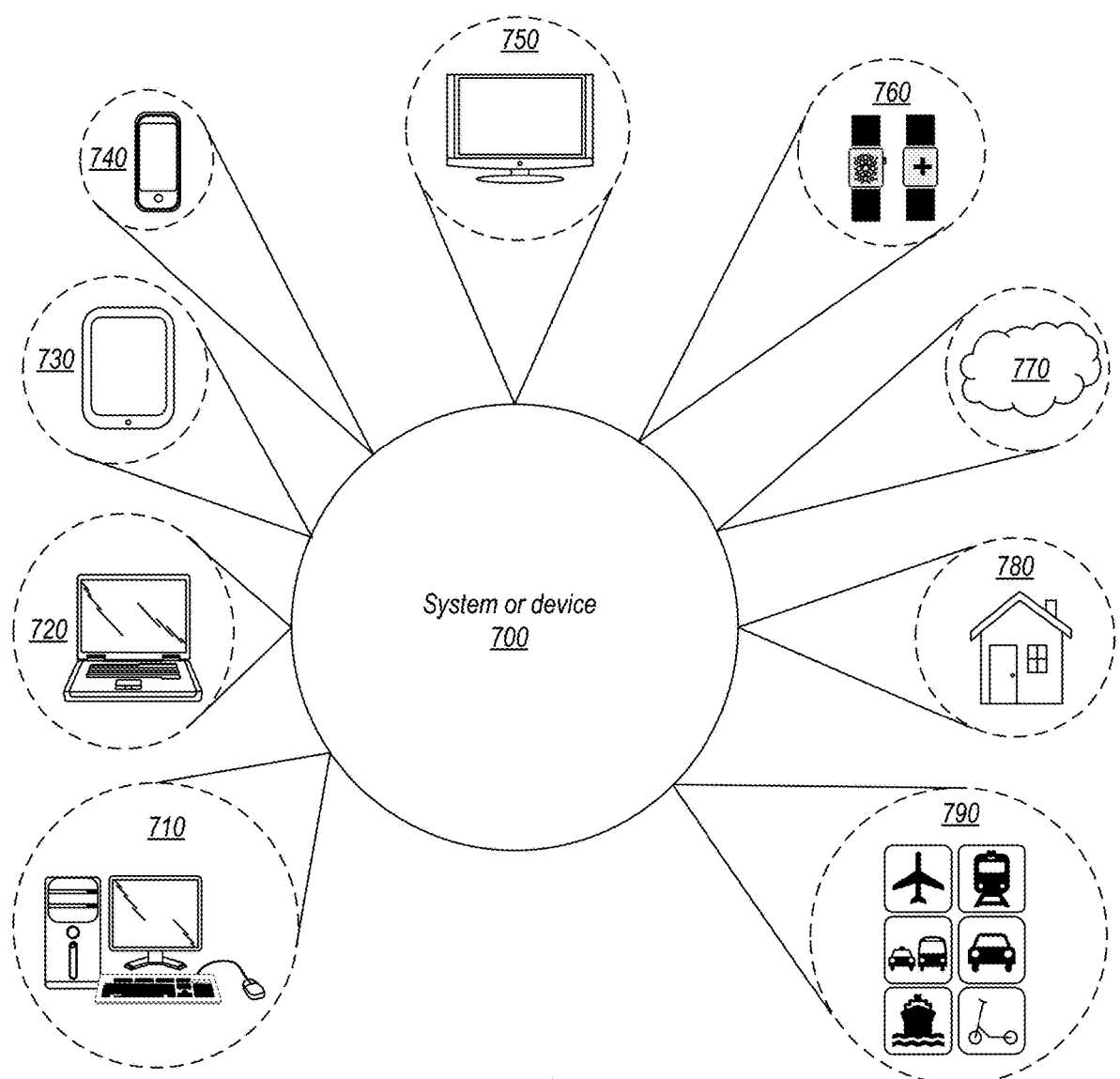
FIG. 7 is a diagram illustrating example applications of disclosed systems and devices, according to some embodiments.

Turning now to FIG. 7, various types of systems that may include any of the circuits, devices, or system discussed above. System or device 700, which may incorporate or otherwise utilize one or more of the techniques described herein, may be utilized in a wide range of areas. For example, system or device 700 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 700 may also be used in various other contexts. For example, system or device 700 may be utilized in the context of a server computer system, such as a dedicated server or on shared hardware that implements a cloud-based service 770. Still further, system or device 700 may be implemented in a wide range of specialized everyday devices, including devices 780 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
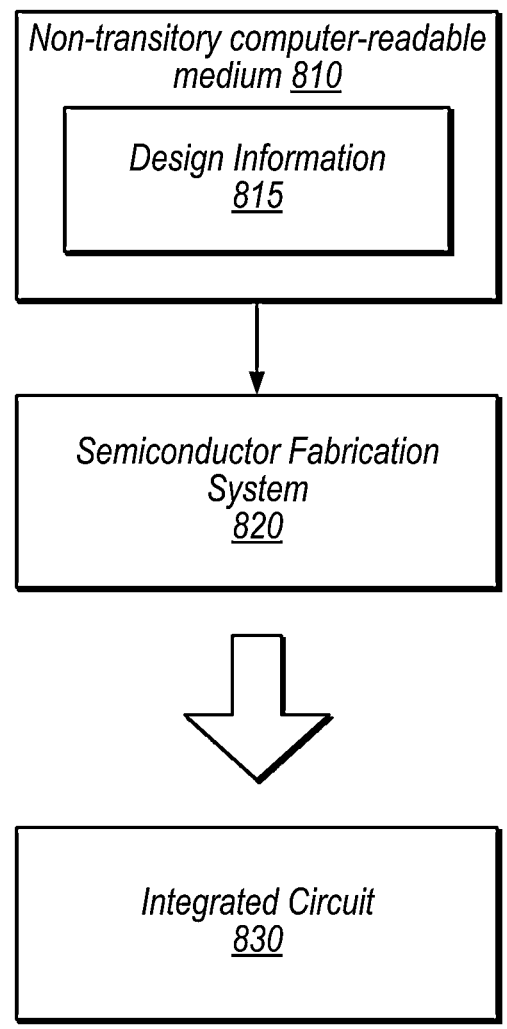
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis, layout, or both of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1B, 2A, 2B, 3, 4, and 6. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   address translation circuitry configured to process requests to translate addresses in a first address space to addresses in a second address space, the address translation circuitry comprising:
      cache circuitry configured to store translation information;
      arbitration circuitry configured to arbitrate among ready requests for access to entries of the cache; and
      hazard circuitry configured to:
         assign a first request a ready status for the arbitration circuitry based on detection of an absence of hazards for a first address of the first request; and
         add a second request to a queue of requests for the arbitration circuitry based on detection of a hazard for a second address of the second request.

2. The apparatus of claim 1, wherein the address translation circuitry is a translation lookaside buffer, the first address space is a virtual address space and the second address space is a physical address space.

3. The apparatus of claim 1, further comprising:
   control circuitry configured to:
      in response to determining that the first address does not hit in the cache circuitry, initiate a fetch for the first request, assign a miss identifier to the first request and indicate that the first request is not ready for arbitration.

4. The apparatus of claim 3, wherein the control circuitry is further configured to:
   based on a fetch response, indicate that a set of one or more requests is ready for arbitration, wherein the set of one or more requests were assigned the miss identifier.

5. The apparatus of claim 4, wherein the miss identifier identifies a block of the cache circuitry.

6. The apparatus of claim 1, wherein the hazard circuitry is configured to manage queues requests using linked list structures.

7. The apparatus of claim 1, wherein the hazard circuitry is configured to detect read after write hazards and enforce that a read to a given address waits for any write responses for the address.

8. The apparatus of claim 1, wherein the first request includes an indication of latency-sensitivity and the arbitration circuitry is configured to prioritize latency sensitive requests over one or more other types of request.

9. The apparatus of claim 1, wherein the address translation circuitry is included in a graphics processor that includes one or more shader cores and wherein the first address space is a graphics address space.

10. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
   address translation circuitry configured to process requests to translate addresses in a first address space to addresses in a second address space, the address translation circuitry comprising:
      cache circuitry configured to store translation information;
      arbitration circuitry configured to arbitrate among ready requests for access to entries of the cache; and
      hazard circuitry configured to:
         assign a first request a ready status for the arbitration circuitry based on detection of an absence of hazards for a first address of the first request; and
         add a second request to a queue of requests for the arbitration circuitry based on detection of a hazard for a second address of the second request.

11. The non-transitory computer readable storage medium of claim 10, wherein the address translation circuitry is a translation lookaside buffer, the first address space is a virtual address space and the second address space is a physical address space.

12. The non-transitory computer readable storage medium of claim 10, wherein the circuit further includes:
   control circuitry configured to:
      in response to determining that the first address does not hit in the cache circuitry, initiate a fetch for the first request, assign a miss identifier to the first request and indicate that the first request is not ready for arbitration.

13. The non-transitory computer readable storage medium of claim 12, wherein the control circuitry is further configured to:
   based on a fetch response, indicate that a set of one or more requests is ready for arbitration, wherein the set of one or more requests were assigned the miss identifier.

14. The non-transitory computer readable storage medium of claim 12, wherein the miss identifier identifies a block of the cache circuitry.

15. The non-transitory computer readable storage medium of claim 10, wherein the hazard circuitry is configured to track sets of requests assigned to the same input of the arbitration circuitry using in-order queue structures.

16. The non-transitory computer readable storage medium of claim 10, wherein the first request includes an indication of latency-sensitivity and the arbitration circuitry is configured to prioritize latency sensitive requests over one or more other types of request.

17. A method, comprising:
- storing, by cache circuitry, translation information for translating addresses in a first address space to addresses in a second address space;
- arbitrating, by arbitration circuitry, among ready requests for access to entries of the cache;
- assigning, by hazard circuitry, a first request to a ready status for the arbitration circuitry based on detection of an absence of hazards for a first address of the first request; and
- adding, by the hazard circuitry, a second request to a queue of requests for the arbitration circuitry based on detection of a hazard for a second address of the second request.

18. The method of claim 17, further comprising:
in response to determining that the first address does not hit in the cache circuitry, initiate a fetch for the first request, assign a miss identifier to the first request and indicate that the first request is not ready for arbitration.

19. The method of claim 18, further comprising:
based on a fetch response, indicating that a set of one or more requests is ready for arbitration, wherein the set of one or more requests were assigned the miss identifier.

20. The method of claim 17, further comprising:
wherein the detected hazard for the second address of the second request is a read after write hazard.

\* \* \* \* \*